United States Patent [19]

Choi

[11] Patent Number: 5,325,184

[45] Date of Patent: Jun. 28, 1994

[54] METHOD OF AND APPARATUS FOR REGULATING COLOR IN A RECEIVED VIDEO SIGNAL

[75] Inventor: Sung-kyu Choi, Suwon, Rep. of Korea

[73] Assignee: Samsung Electronics Co., Ltd., Kyunggi-do, Rep. of Korea

[21] Appl. No.: 874,855

[22] Filed: Apr. 28, 1992

[30] Foreign Application Priority Data

Aug. 20, 1991 [KR] Rep. of Korea ............... 91-14353

[51] Int. Cl.$^5$ .................. H04N 9/64; H04N 9/68; H04N 5/52
[52] U.S. Cl. .................. 348/645; 348/506; 348/507
[58] Field of Search ............ 358/27, 174, 22, 178, 358/183, 40, 23, 36, 35, 38, 20; H04N 9/64, 9/68, 5/52

[56] References Cited

U.S. PATENT DOCUMENTS

| | | | |
|---|---|---|---|
| 3,967,313 | 6/1976 | Miyamoto | 358/27 |
| 4,092,667 | 5/1978 | Akazawa et al. | 358/27 |
| 4,173,023 | 10/1979 | Lagoni et al. | 358/20 |
| 4,237,476 | 12/1980 | Hanma et al. | 358/38 |

FOREIGN PATENT DOCUMENTS

| | | | |
|---|---|---|---|
| 107205 | 2/1984 | European Pat. Off. | H04N 9/46 |
| 84309 | 9/1983 | Japan | H04N 9/02 |
| 149091 | 7/1988 | Japan | H04N 9/68 |
| 171190 | 7/1993 | Japan | H04N 9/535 |

*Primary Examiner*—James J. Groody
*Assistant Examiner*—Glen Burgess
*Attorney, Agent, or Firm*—Sughrue, Mion, Zinn, Macpeak & Seas

[57] ABSTRACT

A method of and apparatus for regulating color in a color broadcasting receiver is disclosed and is composed of a tuner, a demodulator, and a burst level detector for detecting the color burst level of a video signal output from the demodulator and outputting the color burst level as a corresponding control voltage signal. A color controller is disclosed for controlling the color by emphasizing or attenuating the high band components of the video signal output from the demodulator in accordance with the control voltage level from the burst level detector, so that it is possible to receive video signals without much change in color regardless of the variation of the voltage standing wave ratio (VSWR) that varies according to changes in the connection between the broadcast antenna and RF cable.

11 Claims, 4 Drawing Sheets

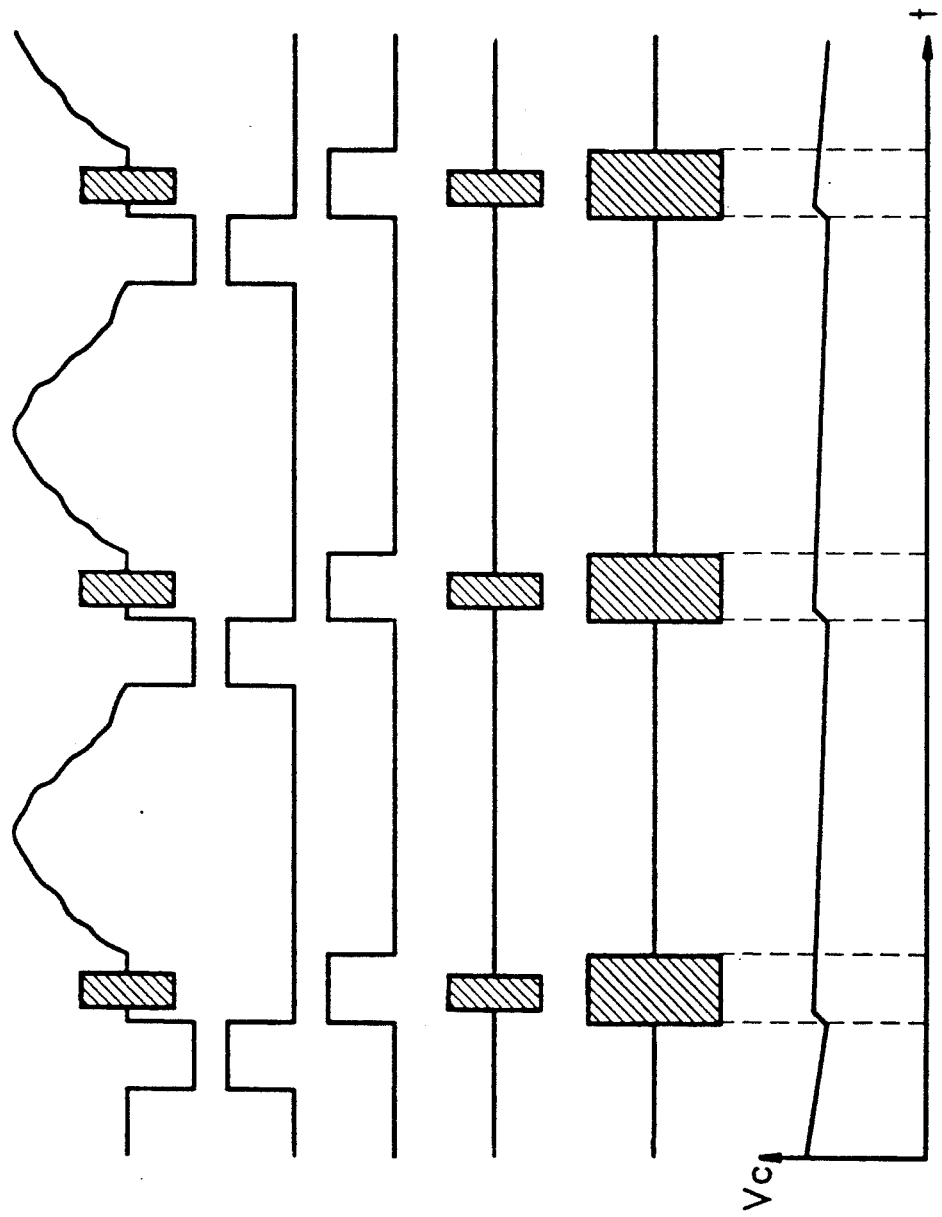

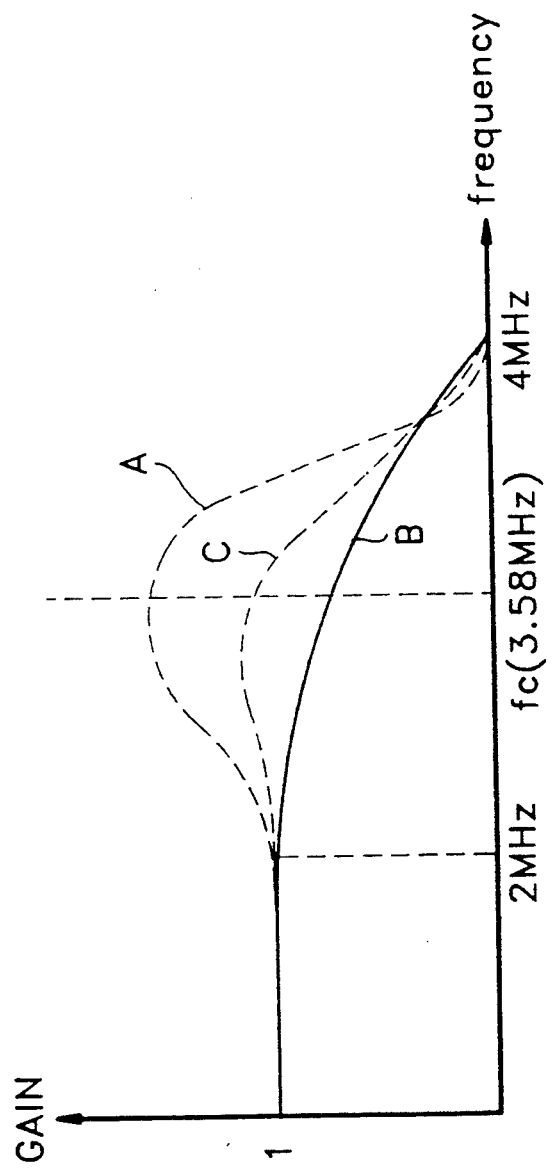

METHOD OF AND APPARATUS FOR REGULATING COLOR IN A RECEIVED VIDEO SIGNAL

BACKGROUND OF THE INVENTION

The present invention relates to a method of and apparatus for regulating color in a received video signal for a broadcasting receiver. More particularly, the invention is directed to a circuit for use in a color television receiver that regulates the high band components of video signals that are received in a form of radio frequency signals through an aerial antenna line by regulating the components according to the amplitude of a burst signal, thereby controlling the color of the broadcast image.

Conventional broadcasting receivers have a problem wherein the voltage standing wave ratio (VSWR) changes according to the condition of the connection between the antenna and the radio frequency (RF) input cable, thereby producing a light screen color for one channel and a dark screen color for another channel.

A color saturation control circuit for a color video receiver has been disclosed in Japanese Patent laid-open Publication No. Sho 64-29081. This control circuit regulates the gain of the burst signal included in a carrier chrominance signal according to a predetermined reference level so as to output the carrier chrominance signal. The disclosed color control circuit comprises a detecting means for detecting the level difference between the burst signal and the reference level, and a memory means for storing a control quantity to increase or decrease the gain of the burst signal. The circuit is used for increasing the gain by the control quantity in response to the level difference detected by the detecting means.

However, a problem with such control circuits is that the circuits do not respond well to variations in the VSVVR caused by the above-mentioned connections between the antenna and the RF input cable. As a result, good color quality is unattainable.

SUMMARY OF THE INVENTION

To overcome the above-mentioned problem, it is an object of the present invention to provide a method of and apparatus for judging the picture quality according to the amplitude of the burst signal of a received video signal, and automatically regulating the color by attenuating or emphasizing the high band components of the video signals in a broadcasting receiver.

To accomplish the above and other objects, the present invention provides a color regulating circuit for use in a color broadcasting receiver comprising:

a tuner for converting a radio frequency signal received from an aerial antenna into an intermediate frequency signal and outputting the result;

demodulating means for demodulating video and audio signals from the intermediate frequency signals supplied from the tuner;

burst level detecting means for detecting a burst level loaded on a video signal output from the demodulating means and outputting a control voltage signal corresponding to that level; and color control means for controlling the color by emphasizing or attenuating the high band components of the video signals output from the demodulating means according to the control voltage signal output from the burst level detecting means.

In the present invention, a method of regulating color for use in a color broadcasting receiver comprises the steps of:

detecting a burst level of a received broadcast video signal; and varying the amplitude level of high frequency components of the video signal in accordance with the burst level detected, wherein the color of the picture represented by the received broadcast video signal is enhanced in response to the burst level detected.

BRIEF DESCRIPTION OF THE DRAWINGS

The above objects and other advantages of the present invention will become more apparent by describing in detail the preferred embodiment of the present invention with reference to the attached drawings, in which:

FIGS. 3A-3F show operational waveforms of the burst level detector 30 shown in FIG. 2;

FIG. 5 is a graph illustrating the transfer characteristic of the equivalent circuit of the color controller 40 shown in FIG. 4B.

DETAILED DESCRIPTION OF THE PREFERRED EMBODIMENT

Hereinafter, a preferred embodiment of the color regulating circuit according to the present invention is illustrated with reference to the accompanying drawings.

Figure 1:
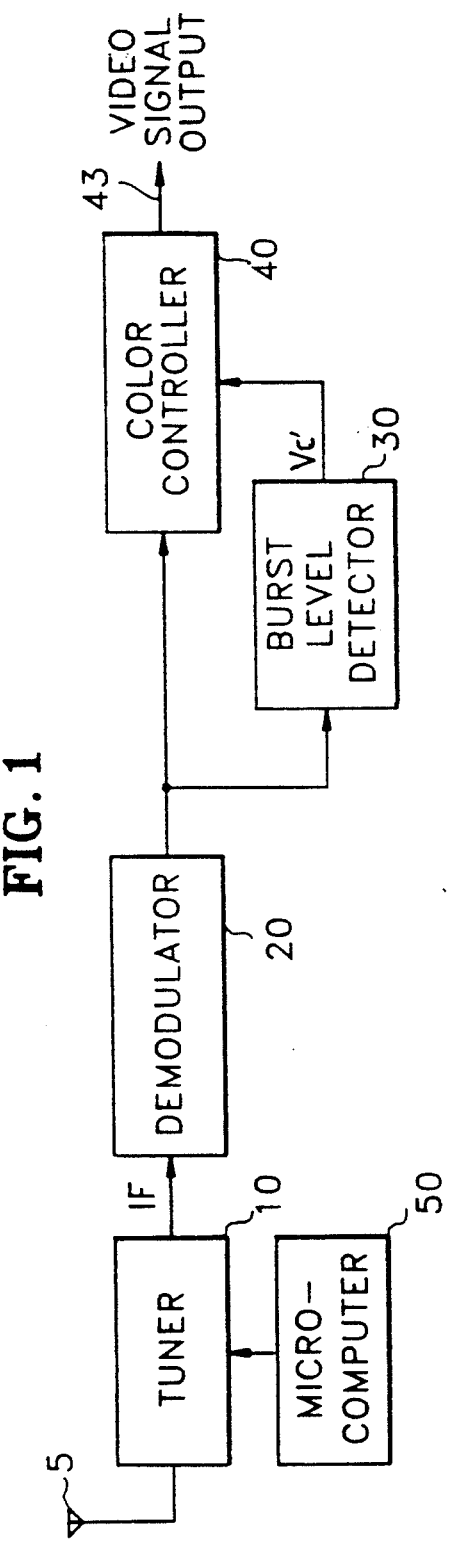
FIG. 1 is an overall block diagram of a color regulating circuit according to the present invention.

Referring to FIG. 1, the input of a tuner 10 is linked with an aerial antenna 5, and its output is connected to the input of a demodulator 20. The input of a burst level detector 30 is connected to the output of demodulator 20, and its output is connected to the control terminal of a color controller 40. The input of color controller 40 is also connected to the output of demodulator 20, and its output terminal 43 outputs a video signal which has been color-controlled. The control signal output terminal of microcomputer 50 is connected to the control signal input terminal of tuner 10.

In operation, tuner 10 converts the radio frequency (hereinafter referred to as "RF") signal of an appropriate channel received through antenna 5 and selected by microcomputer 50 into an intermediate frequency (hereinafter referred to as "IF") signal and outputs the result. Demodulator 20 demodulates the video and audio signals from the IF signals output from tuner 10. Burst level detector 30 detects the noise and burst signal levels which have been applied to the burst signal portion of the video signals output by demodulator 20, and outputs a control signal which is a control voltage signal Vc' corresponding to the burst level. Color controller 40 controls the color of video signals output from demodulator 20 according to the control voltage signal Vc' output from burst level detector 30. That is, burst level detector 30 produces a low control voltage signal when there is a lot of noise in the output video signals or the amplitude of the color burst signal is large, and produces a high control voltage signal where the amplitude of the color burst signal is small.

Hence, in the case of a video signal having low signal-to-noise (S/N) ratio and dark color, the high band components (2-4 MHz) of the video signals are attenuated to enhance the S/N ratio and lighten the color of the broadcast picture. In the case of a high S/N ratio and light color, the high band components of the video signals are emphasized to darken the color, thereby resulting in a clearer broadcast picture quality.

Figure 2:
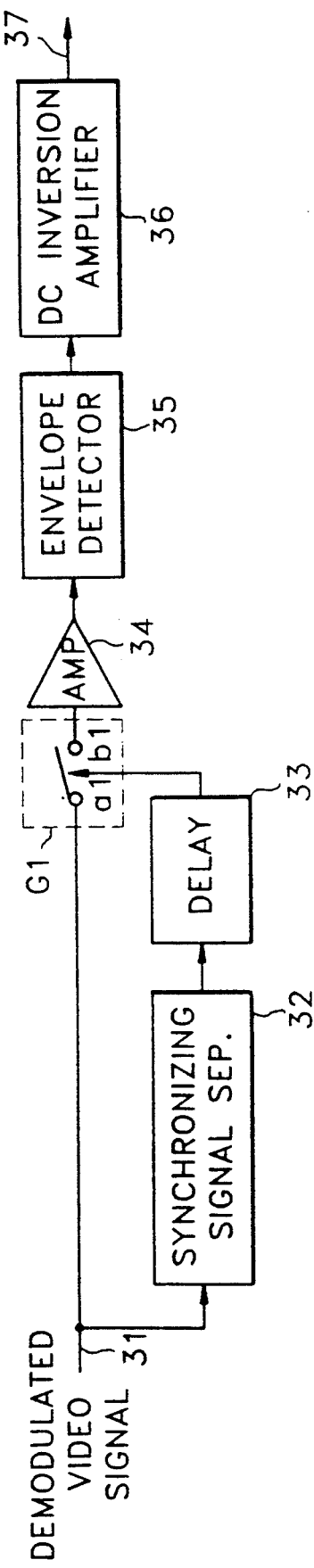
FIG. 2 is a detailed circuit diagram of the burst level detector 30 shown in FIG. 1.

FIG. 2 is a detailed block diagram of the burst level detector 30 shown in FIG. 1.

Referring to FIG. 2, an input line 31 is connected to the output of demodulator 20 illustrated in FIG. 1. Input line 31 is linked with a contact al of a gate G1, and the input of a synchronizing signal separator 32. The input of a delay 33 is connected to the output of synchronizing signal separator 32, and its output is connected to the control terminal of gate G1. The input of an amplifier 34 is connected to a contact b1 of gate G1, and its output is connected to the input of an envelope detector 35. The input of a DC inversion amplifier 36 is connected to the output of envelope detector 35, and its output terminal 37 is connected to the input of color controller 40 shown in FIG. 1.

The description of the operation of the burst level detector 30 shown in FIG. 2 will be made with reference to the waveforms of FIGS. 3A-3F as follows.

Referring to FIG. 2, synchronizing signal separator 32 separates the horizontal synchronizing signal (FIG. 3B) from the composite video signal (FIG. 3A) which is output from the demodulator 20 shown in FIG. 1. The color burst portion of the video signal is shown crosshatched. Gate G1, comprising a control switch, passes the composite video signal from demodulator 20 only when the output signal (FIG. 3C) from delay 33 is high, and thereby results in detection of a color burst signal (FIG. 3D). As shown in FIG. 3E, amplifier 34 amplifies the color burst signal (FIG. 3D) output through gate G1. Envelope detector 35 is made up of an integrator, and it envelope-detects the output signal (FIG. 3E) of amplifier 34 and outputs the DC control voltage Vc' shown in FIG. 3F. DC inversion amplifier 36 inversion-amplifies the output signal (FIG. 3F) of envelope detector 35 to output it to the control terminal of color controller 40 shown in FIG. 1.

Figure 4A:
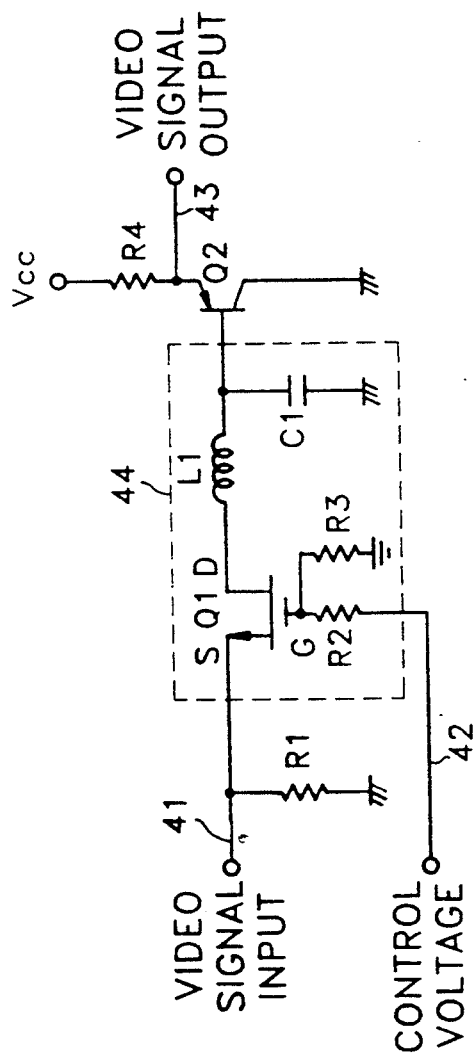
FIG. 4A is a detailed circuit diagram of the color controller 40 shown in FIG. 1.

FIG. 4A is a detailed circuit diagram of the color controller employed in FIG. 1.

Referring to FIG. 4A, an input terminal 41 is connected to the output of demodulator 20 shown in FIG. 1, and a control terminal 42 is connected to output 37 of DC inversion amplifier 36 shown in FIG. 2.

The gate terminal G of a field-effect transistor (FET) Q1 is combined with a bias resistor R2 which is connected to control terminal 42, the source terminal S is connected to input terminal 41, and the drain terminal D is connected in series to an inductor L1. A bias resistor R1 is connected between source terminal S of the FET Q1 and ground, while another bias resistor R3 is connected between gate terminal G of FET Q1 and ground. The base of a PNP transistor Q2 is connected to the other side of inductor L1, its emitter is connected to a resistor R4, which is connected to a supply power terminal Vcc, and its collector is grounded. A capacitor C1 is connected between the base of transistor Q2 and ground. An output terminal 43 is connected to the emitter of transistor Q2.

The operation of the circuit in FIG. 4A will be hereinafter described with reference to FIG. 4B and FIG. 5.

Referring to FIG. 4A, resistors R1, R2, and R3 are the bias resistors for FET Q1. The equivalent resistance of FET Q1 is changed by the variation of the resistance values of bias resistors R1, R2, and R3.

Inductor L1 and capacitor C1, which are connected to drain terminal D of FET Q1, are included in a high band peaking circuit 44 for video signals received via input terminal 41, and resonate at the color subcarrier frequency. Transistor Q2 acts as a buffer for outputting the signal supplied from high band peaking circuit 44 via output terminal 43.

Figure 4B:
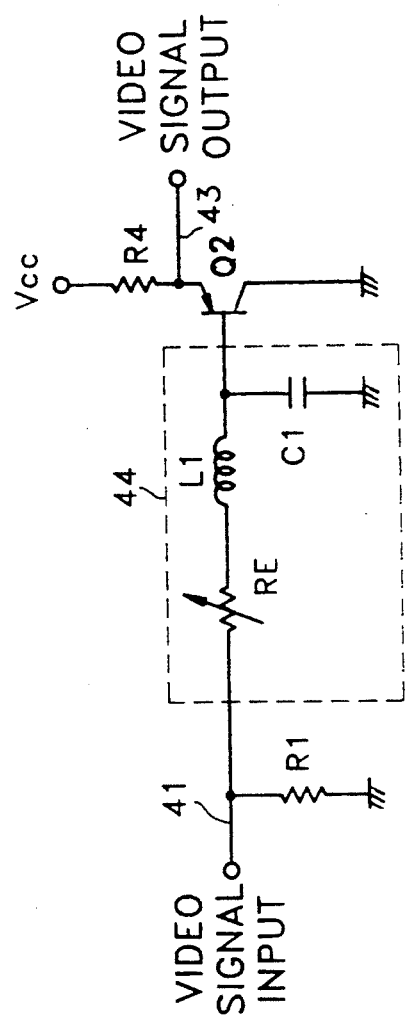
FIG. 4B illustrates an equivalent circuit of the color controller 40 shown in FIG. 4A.

At this point, bias resistors R2 and R3, which are connected to FET Q1, are able to be represented by the equivalent resistor RE as shown in FIG. 4B. The resistance value of resistor RE is varied according to the control voltage signal Vc' output from DC inversion amplifier 36 and input to the gate terminal of transistor Q1.

The video signal received from input terminal 41 is controlled by the control voltage signal Vc' received via control terminal 42. The transfer characteristic of the video signal when supplied to output terminal 43 via high band peaking circuit 44 is shown in FIG. 5. That is, as the color burst signal, which is loaded on the video signal input from the signal input source, is large or the noise in the picture increases, the level of control voltage signal Vc' received at control terminal 42 is lowered, and the resistance value of resistor RE shown in FIG. 4B increases. Accordingly, the high band components are attenuated and controlled as seen in curve C shown in FIG. 5. This control results in improving the picture's S/N ratio and lowering its color burst level.

On the other hand, when the color burst level is low and there is no noise, i.e., the level of control voltage signal Vc' received at control terminal 42 is high, the resistance value of resistor RE decreases and the high band component is emphasized as seen in curve A shown in FIG. 5, thereby helping to more clearly control the color.

Therefore, the operation of controlling in color controller 40 can be summarized as follows.

TABLE 1

| S/N Ratio | Color | Color control |
| --- | --- | --- |
| high | dark | controlled as curve B |
| high | light | controlled as curve A |
| low | dark | controlled as curve B |
| low | light | controlled as curve C |

As described above, the method of and apparatus for regulating color in a received video signal according to the present invention has the advantages in that the high band components of video signals are attenuated or emphasized according to the color burst level loaded on a video signal received as an RF signal through an aerial antenna. Hence, noise can be eradicated in a small current electric field and the condition of the connection between the antenna and RF input cable does not greatly vary the VSWR. As a result, it possible to receive signals without having large variations in color.

What is claimed is:

1. A color regulating circuit for use in a color broadcasting receiver, the circuit comprising:
    a tuner for converting a radio frequency signal received through an aerial antenna into an intermediate frequency signal;

demodulating means for demodulating audio and video signals from the intermediate frequency signal output from said tuner;

burst level detecting means for detecting the color burst level of video signals output from said demodulating means and outputting the color burst level as a corresponding control voltage signal; and color control means for controlling the high band components of the video signals output from said demodulating means according to the level of the control voltage signal output from said burst level detecting means, wherein said burst level detecting means comprises:

delay means for delaying a synchronizing signal loaded on the video signal output from said demodulating means for a predetermined period, said delayed synchronizing signal being used as a keying pulse;

first detecting means for detecting the color burst signal by gating the video signal of said demodulating means only for the duration of a predetermined level of the keying pulse output from said delay means; and second detecting means for detecting the envelope of the color burst signal output from said first detecting means and outputting the control voltage signal corresponding to the burst signal level.

2. A color regulating circuit for use in a color broadcasting receiver, the circuit comprising:

a tuner for converting a radio frequency signal received through an aerial antenna into an intermediate frequency signal;

demodulating means for demodulating audio and video signals from the intermediate frequency signal output from said tuner;

burst level detecting means for detecting the color burst level of video signals output from said demodulating means and outputting the color burst level as a corresponding control voltage signal; and color control means for controlling the high band components of the video signals output from said demodulating means according to the level of the control voltage signal output from said burst level detecting means, wherein said burst level detecting means comprises:

a synchronizing signal separator for separating the horizontal synchronizing signal which is applied to a video signal output from said demodulating means;

a delay device for delaying the horizontal synchronizing signal output from said synchronizing signal separator for a predetermined period, said delayed horizontal synchronizing signal being used for a keying pulse;

a gate circuit for outputting only the color burst signal of the video signal output from said demodulating means by the keying pulse output from said delay device;

an envelope detector for detecting the envelope of the color burst signal output from said gate circuit and outputting the DC control voltage signal; and an inversion amplifier for inversely outputting the DC control voltage signal output from said envelope detector.

3. A color regulating circuit as claimed in claim 2, wherein said color control means comprises:

a peaking circuit for emphasizing or attenuating the high band components of video signal output from said demodulating means according to the control voltage signal which has been output from said burst level detecting means.

4. A color regulating circuit as claimed in claim 3, wherein said peaking circuit comprises:

variable resistor means connected to the output of said demodulating means for changing resistances value according to the output signal of said inversion amplifier;

an inductor which is connected in series with said variable resistor means; and a capacitor which is connected between said inductor and ground.

5. A color regulating circuit as claimed in claim 4, wherein said variable resistor means comprises a field-effect transistor which receives the output signal of said demodulating means at its source terminal connected with ground via a first bias resistor, receives the output signal of said inversion amplifier via a second bias resistor at its gate terminal which is connected to ground via a third bias resistor, and connects its drain terminal with said inductor.

6. A color regulating circuit as claimed in claim 5, wherein said color control means further comprises a buffer for buffering the signal output from said peaking circuit.

7. A color regulating circuit for use in a color broadcasting receiver, the circuit comprising:

a tuner for converting a radio frequency signal received through an aerial antenna into an intermediate frequency signal;

demodulating means for demodulating audio and video signals from the intermediate frequency signal output from said tuner;

burst level detecting means for detecting the color burst level of video signals output from said demodulating means and outputting the color burst level as a corresponding control voltage signal; and color control means for controlling the high band components of the video signals output from said demodulating means according to the level of the control voltage signal output from said burst level detecting means, wherein said burst level detecting means comprises:

a synchronizing signal separator for separating the horizontal synchronizing signal which is applied to a video output from said demodulating means;

a delay device for delaying the horizontal synchronizing signal output from said synchronizing signal separator for a predetermined period, said delayed horizontal synchronizing signal being used for a keying pulse;

a gate circuit for outputting only the color burst signal of the video signal output from said demodulating means by the keying pulse output from said delay device;

an envelope detector for detecting the envelope of the color burst signal output from said gate circuit and outputting the DC control voltage signal; and an inversion amplifier for inversely outputting the DC control voltage signal output from said envelope detector.

8. The color regulating circuit as claimed in claim 7, wherein said color control means comprises:

a peaking circuit for emphasizing or attenuating the high band components of video signal output from said demodulating means according to the control voltage signal which has been output from said burst level detecting means.

9. The color regulating circuit as claimed in claim 8, wherein said peaking circuit comprises:
- variable resistor means connected to the output of said demodulating means for changing resistances values according to the output signal of said inversion amplifier;
- an inductor which is connected in series with said variable resistor means; and
- a capacitor which is connected between said inductor and ground.

10. The color regulating circuit as claimed in claim 9, wherein said variable resistor means comprises a field-effect transistor which receives the output signal of said demodulating means at its source terminal connected with ground via a first bias resistor, receives the output signal of said inversion amplifier via a second bias resistor at its gate terminal which is connected to ground via a third bias resistor, and connects its drain terminal with said inductor.

11. The color regulating circuit as claimed in claim 10, wherein said color control means further comprises a buffer for buffering the signal output from said peaking circuit.

* * * * *